July 10, 1956
M. A. POWERS
2,753,886
GLASS FLOAT
Filed July 29, 1952
2 Sheets-Sheet 1
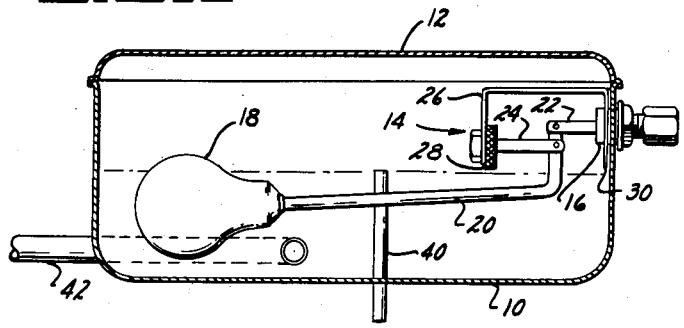
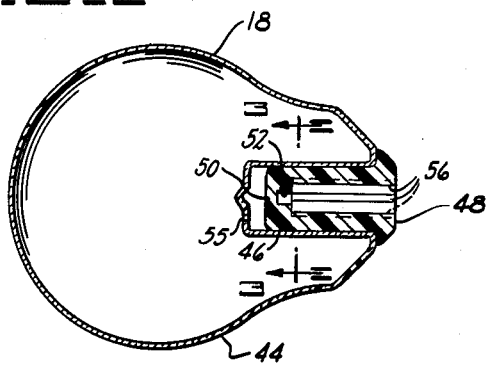
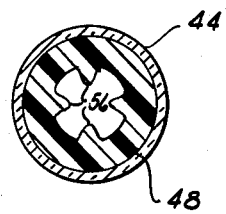
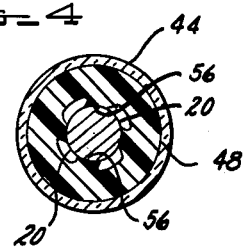
INVENTOR.
MILTON A. POWERS
BY
ATTORNEY July 10, 1956　　　M. A. POWERS　　　2,753,886
GLASS FLOAT
Filed July 29, 1952　　　　　　　　2 Sheets-Sheet 2
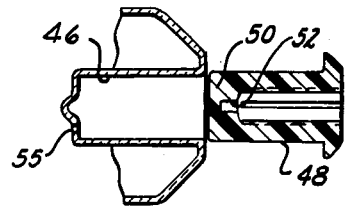
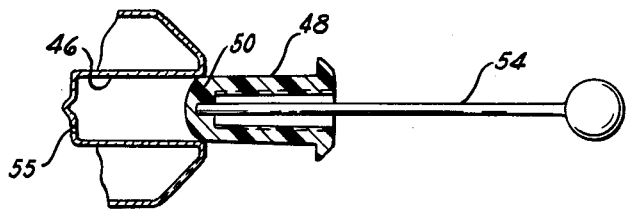
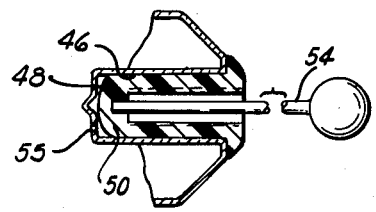
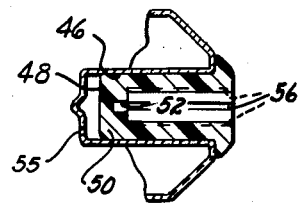
INVENTOR.
MILTON A. POWERS
BY
*Arthur M. Smith*
ATTORNEY

United States Patent Office 2,753,886
Patented July 10, 1956

2,753,886

GLASS FLOAT

Milton A. Powers, Detroit, Mich.

Application July 29, 1952, Serial No. 301,459

7 Claims. (Cl. 137—452)

The present invention relates to liquid supply regulators, and more particularly to an improved float construction for use in regulating the supply of water to humidifiers, water toilet reservoirs, or the like. This invention is a modified form of the invention disclosed in my co-pending application Serial No. 223,928, filed May 1, 1951, now abandoned, and is a continuation-in-part thereof. It distinguishes therefrom by the structure utilized for securing the float construction to a float arm.

As was explained in the aforesaid co-pending application, it has been conventional practice heretofore to make floats from sheet copper or similar metals, which will not corrode rapidly when used in water. These floats generally are fabricated by suitably shaping the component parts, as by stamping, for example, and thereafter brazing or soldering them together to form a watertight construction.

While copper floats of this type have been used in very large volume, they leave much to be desired. In many localities the water in which the floats operate contains small amounts of salts in solution which react to cause deterioration of the copper and the solder holding the float together. The copper becomes pitted and leaks develop. To overcome this, heavier copper sheet may be used, but then the float becomes very costly, and its buoyancy is reduced due to the added weight. The solder, especially the lead constituent, goes into solution and the joints come apart, causing float failure. In some instances 100% tin solder is used, and while the results are superior, the solder is costly and hard to obtain.

In some localities the life of a float may be less than one year, and thus a better float with long life and reliable operation is urgently needed. Many efforts have been made to meet the need, including floats molded from plastics, cut from blocks of plastic and glass foam; and also floats blown from glass. Each method has distinct disadvantages, which will not be enumerated here, except to refer briefly to the blown glass floats. These were widely marketed during the last war period when copper was unobtainable, but were quickly driven from the market when the copper float again became available.

Such glass floats were actually bottles, thick and heavy in order to provide sufficient strength to withstand shock in handling and use. Attachment was by means of a threaded metal connector crimped over the neck of the bottle. The resultant float assembly was of limited buoyancy. Furthermore, the cost of manufacturing was high, running about four or five times that of the conventional copper float.

In order to overcome these shortcomings, the improved constructions of the types disclosed in my aforesaid application and herein disclosed have been developed. By using a light weight glass blank similar to an electric light bulb, low initial cost was obtained, but it was soon learned this was impractical due to the inability of the bulb to withstand shocks or strains transmitted through the attached float arm during handling, attachment and use. It was only after extended tests of various arrangements that the combination described in the aforesaid application of light weight bulb with re-entrant cylindrical cavity, resilient shock absorbing support and metallic connector was found. The results were so startlingly different that it was immediately realized that the attempted use of a light bulb float with all its desirable characteristics, which had heretofore been quite impractical, was now not alone practical, but indeed provided a most rugged and reliable construction, able to withstand a high degree of shock and strain in handling, installation and use.

Thereafter, further extensive tests have resulted in the present development whereby the metal connector of my prior improved construction has been eliminated, and the resilient shock absorbing support has been modified in a manner to be described more fully hereinafter. In conducting these further tests it was desired to develop a resilient joint for connecting the glass bulb directly to the float arm in such a manner that the joint could be easily inserted into the bulb and thereafter it would resiliently hold itself in place, while effecting the optimum resilient connection between the float arm and the glass bulb. This modified form of the invention retains all the desirable features of my prior improved construction, and in addition, it provides a float construction that is adapted to be assembled in an expeditious and economical manner and which provides a plug-in or slip-on attachment for connecting it to a conventional float arm.

With the foregoing premises in mind it is one of the primary objects of the present invention to provide a float of the foregoing character which includes a thin glass bulb adapted to be mounted resiliently on a float arm so that the thin glass walls of the bulb will not be unnecessarily strained by forces tending to move the arm relative to the float, thereby avoiding breakage of the bulb.

It is another object of the present invention to provide a glass float having a resilient shock absorbing support which is constructed and arranged to facilitate economic installation of said support in the bulb of the glass float and which provides a resilient plug-in or slip-on type attachment for connecting the float to a conventional float arm.

A further object of the present invention is to provide a resilient shock absorbing support for the glass float, which support is characterized by the novel manner in which the float arm is resiliently held so that shocks and strains will not be imparted through the support to the glass bulb, thereby avoiding breakage of the bulb.

It is another object of the present invention to provide a float of the foregoing character which includes a rubber support or insert for mounting the glass bulb on a float arm, said sleeve having resilient means for securing it to said arm so that more universal application can be made of the float.

Other objects of this invention will appear in the following description and appended claims, reference being had to the accompanying drawings forming a part of this specification wherein like reference characters designate corresponding parts in the several views.

In the drawings:

Fig. 1 is a sectional view showing the present invention mounted in a water supply regulator;

Fig. 2 is a sectional view of the present invention illustrating the manner in which the resilient support or insert is mounted in the glass float;

Fig. 3 is a sectional view taken on the line 3—3 of Fig. 2;

Fig. 4 is a sectional view similar to that of Fig. 3, but showing a float arm in cross section inserted into the resilient support; and Figs. 5, 6, 7 and 8 are fragmentary sectional views illustrating the manner in which the resilient support or insert is inserted into the float cavity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the present invention is shown in Fig. 1 in use with a device for regulating the supply of water to a humidifier (not shown). The device includes a float tank 10 having a detachable cover 12, which forms a water chamber. A float control mechanism 14 is provided with the tank 10 to maintain the water therein at a constant level. The float control mechanism 14 includes a plunger valve 16 for controlling the flow of water into the water chamber and is operated by the float 18 through the connecting arm 20 and the link 22. The arm 20 is pivotally connected to a rod 24 which in turn is adjustably supported on the U-shaped bracket 26, by the thumb nut 28. The bracket 26 has an end portion 30 rigidly secured to the adjacent inner wall of the water chamber. An overflow pipe 40 is also provided in the water chamber.

A conduit 42 communicates with the lower portion of the water chamber and leads to a humidifier (not shown) so that the water level in the latter will be maintained at the same level as the water in the water chamber formed by the tank 10.

Referring to Fig. 2, the float 18 can be seen in greater detail. Float 18 includes a relatively thin glass bulb 44, having a recessed portion or cavity 46 in its one end. The glass bulb 44 is preferably made in a spherical shape with a neck portion extending in the one direction in which the recessed portion 46 is formed. This is the preferred shape for making the float, since it imparts strength thereto, but it should be understood that it is contemplated that other shapes may be employed. It is found that bulb 44 can be made in mass production quantities at a relatively low cost by the process normally used in making the globe portion of a conventional light bulb.

The recessed portion or cavity 46 is preferably cylindrical in shape and is adapted to receive the resilient shock absorbing support or rubber insert 48. The latter is constructed and arranged so that once it has been introduced into the cavity 46 it will resiliently hold itself therein. Also, it has a fluted inner surface, to be more fully described hereinafter, which permits the float 18 to be slipped easily and safely onto the end of the float arm 20. The rubber insert 48 has a relatively heavy base 50 which has an aperture 52 extending part way therethrough.

Referring to Figs. 5 to 8, the method of introducing the rubber insert 48 into the cavity 46 will now be explained. As can be seen in Fig. 5, the rubber insert 48 cannot be pushed into the cavity 46 because the diameter of the former is slightly larger than that of the latter. However, when a rod, such as is shown at 54 in Fig. 6 is introduced into the rubber insert 48 and is pushed against the heavy base 50 to elongate the rubber insert 48, the diameter thereof, particularly at the base end, will be reduced and it can be readily slipped into the cavity to the position shown in Fig. 7. Thereafter the rod 54 can be withdrawn and the rubber insert will be in the position shown in Fig. 8.

When the rod 54 is removed the rubber is no longer extended and stretched, and therefore it tends to return to its original size and shape as shown in Fig. 5. As its diameter at the heavy base 50 was greater than the opening of the cavity 46, the rubber will squeeze tightly against the glass making an air tight and secure attachment. Thus, a construction is disclosed which is an ideal resilient connector, which can be quickly and easily inserted.

In the manufacture of the glass bulb 44 it is necessary that an opening 55 be left in the cavity 46. Previously, this opening 55 has not been easily sealed, and it can be understood that it must be sealed if the glass bulb 44 is to form a satisfactory float. However, this sealing problem has been done away with by the present invention. As explained above, when the rubber insert 48 has been positioned in the cavity 46 the rubber at the heavy base 50 will squeeze tightly against the glass, and thus, will very effectively seal the inner end of the cavity 46 so as to prevent any leakage of water or other liquid into the float.

If desired, prior to introducing the rubber insert 48 into the cavity 46, a small amount of a conventional type of rubber cement may be applied to the under side of the base 50.

In the embodiment of my invention disclosed in this application the rubber insert 48 is constructed and arranged so that the float 18 can be slipped directly on to the float arm 20 and a very effective resilient joint will be provided to prevent the transmission of any shocks or strains from the arm 20 to the bulb 44. As best seen in Figs. 2 and 3, the internal surface of the rubber insert 48 is fluted. Each of the longitudinally extending projecting ribs 56 is compressed to a position such as shown in Fig. 4 when the float 18 is inserted on the float arm 20. By virtue of this arrangement, the ribs will be under uniform compression and will grip the arm 20 rather firmly, and at the same time will be in a position to accommodate any twists or other relative motions between the bulb 44 and the arm 20. Thus, the bulb 44 will not be subjected to undue stresses or strains because of being attached to the float arm 20, and this, in turn, avoids breakage of the glass bulb.

This type of slip-on or plug-in attachment for the float 18 can be used with any conventional float arm whether or not the same is threaded at its distal end for attaching it to conventional floats heretofore used. Thus, the present float construction is well suited for use in replacing defective floats from liquid control apparatus now in use as well as for use with new liquid control apparatus.

From the above description, it will be understood that the float 18 is a strong float construction which will not readily break as might be expected when using a relatively thin glass bulb. It has been found by virtue of the resilient mounting for the float arm, as described above, that the float assembly is now very durable and strong. A very low percentage of breakage occurs when using the above-described glass float, and this is the direct result of the new manner of supporting the glass portion of the float on the float arm.

It will be seen further that an extremely lightweight float is provided giving greater buoyancy than heretofore practicable. The float is very simply constructed and can be made at lower cost than was possible heretofore with the conventional type of glass and copper floats.

While the present invention is described by way of example as used with humidifier equipment, for which it is particularly suited, it will be apparent to those skilled in the art that the present invention may be employed with other types of equipment using float control means.

Having thus described my invention, I claim:

1. In a float type apparatus for regulating the supply of liquids, a glass float having relatively thin glass walls and a re-entrant neck portion extending a substantial distance back into the float, and a resilient sleeve mounted in said neck portion and having a fluted inner wall, said sleeve extending substantially its entire length within the re-entrant neck portion.

2. In a float type apparatus for regulating the supply of liquids, a float formed from a thin shell having a re-entrant neck portion extending a substantial distance back into the float, a hollow resilient insert of nearly the same length as said neck portion and extending substantially its full length into said neck portion, said insert being secured in said neck portion and having a fluted cylindrical inner wall open at one end for receiving a float arm, and a float arm held in said insert by the fluted portions thereof.

3. In a float type apparatus for regulating the supply of liquids, a float formed from a sealed thin shell having a re-entrant neck portion extending a substantial distance back into the float, a hollow insert of nearly the same length as said neck portion and extending substantially its full length into said neck portion, said insert being secured in said neck portion and having an open end for receiving a float arm, said insert having resilient projections on its inner wall, and a float arm extending into said insert and being resiliently held by said projections.

4. A float unit for use in regulating the supply of liquids comprising a glass bulb having a cylindrical re-entrant neck portion of substantially uniform diameter extending back into the float, a cylindrical rubber insert having resilient projections, located around its inner wall and closed at one end by a relatively thick end wall, said insert extending into said neck portion nearly to the axially inner extremity of the latter and with its closed end innermost, the outer diameter of said insert being slightly larger than the inner diameter of said neck portion so that after said insert has been pressed into said neck portion the end wall of the former will be held in the latter in a state of compression.

5. An article of manufacture comprising a glass float formed from a thin bulb-like glass shell of uniform thickness open at one end, a glass tubing substantially closed at one end extending into the opening in said glass shell, said glass shell and glass tubing being joined at their open ends so as to form a sealed re-entrant neck, and a cylindrical rubber insert closed at one end by a relatively thick end wall, said insert extending into said neck portion substantially its full length with its closed end innermost, the outer diameter of said insert being slightly larger than the inner diameter of said neck portion so that after said insert has been pressed into said neck portion the end wall of the former will be held in the latter in a state of compression.

6. An article of manufacture comprising a glass float formed from a thin bulb-like glass shell open at one end, a glass tubing substantially closed at one end extending into the opening in said glass shell, said glass shell and glass tubing being joined together at their open ends so as to form a sealed re-entrant neck portion, and a rubber sleeve closed at its one end and open at its other end, said sleeve extending nearly its full length into said neck portion with its closed end innermost, the closed end of said sleeve being formed by a relatively thick wall to render the sleeve less collapsible adjacent the closed end than near the open end so that when the sleeve has been pressed into the neck portion the closed end of the former will be held in a state of compression in the latter.

7. In a float type apparatus for regulating the supply of liquids, a glass float having relatively thin glass walls and a re-entrant neck portion extending a substantial distance back into the float, and a rubber-like sleeve carried within said neck portion and extending at least from adjacent the inner end to the outer end of said neck portion for resiliently holding the end of a float arm.

References Cited in the file of this patent

UNITED STATES PATENTS

| | | |
|---|---|---|
| 928,670 | Kremenezky | July 20, 1909 |
| 1,214,020 | Douglas | Jan. 30, 1917 |
| 1,447,231 | Barry | Mar. 6, 1923 |
| 1,457,055 | Brewington | May 29, 1923 |
| 1,547,052 | Larson | July 21, 1925 |
| 1,842,184 | Madden | Jan. 19, 1932 |
| 2,041,704 | Gordon et al. | May 26, 1936 |
| 2,366,860 | Kraft | Jan. 9, 1945 |
| 2,543,396 | Wolff | Feb. 27, 1951 |
| 2,546,312 | Larymore | Mar. 27, 1951 |
| 2,558,589 | Skolfield | June 26, 1951 |
| 2,594,955 | Markowitz | Apr. 29, 1952 |

FOREIGN PATENTS

| | | |
|---|---|---|
| 121,836 | Great Britain | Jan. 9, 1919 |